US011263571B2

(12) United States Patent
Clark et al.

(10) Patent No.: US 11,263,571 B2
(45) Date of Patent: Mar. 1, 2022

(54) SYSTEM TO FACILITATE GUIDED NAVIGATION OF DIRECT-ACCESS DATABASES FOR ADVANCED ANALYTICS

(71) Applicant: Hartford Fire Insurance Company, Hartford, CT (US)

(72) Inventors: Keith Thomas Clark, Bristol, CT (US); James A. Madison, Windsor, CT (US); Moon Nagar, South Windsor, CT (US); Scott Mitchell Mackenthun, West Hartford, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 158 days.

(21) Appl. No.: 16/360,429

(22) Filed: Mar. 21, 2019

(65) Prior Publication Data
US 2020/0302351 A1   Sep. 24, 2020

(51) Int. Cl.
*G06Q 10/06*   (2012.01)
*G06F 16/93*   (2019.01)
*G06F 3/0482*   (2013.01)
*G06N 20/00*   (2019.01)

(52) U.S. Cl.
CPC ....... *G06Q 10/0635* (2013.01); *G06F 3/0482* (2013.01); *G06F 16/93* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 6,631,496 B1 * | 10/2003 | Li | G06F 16/9562 715/200 |
| 7,062,561 B1 * | 6/2006 | Reisman | G06F 16/00 709/227 |
| 7,668,850 B1 | 2/2010 | Bierner | |
| 9,274,668 B2 | 3/2016 | Powers et al. | |
| 9,712,576 B1 * | 7/2017 | Gill | G06F 3/04817 |
| 10,534,826 B2 * | 1/2020 | Breedvelt-Schouten | G06F 16/248 |
| 10,541,054 B2 * | 1/2020 | Zalis | G16H 70/20 |
| 2003/0084015 A1 * | 5/2003 | Beams | G09B 5/14 706/47 |

(Continued)

*Primary Examiner* — Sujay Koneru
(74) *Attorney, Agent, or Firm* — Buckley, Maschoff & Talwalkar LLC

(57) ABSTRACT

System and methods may facilitate user guidance to risk relationship documents for an enterprise. A risk relationship document data store may contain a set of electronic data records, each electronic data record being associated with a risk relationship document and including a document identifier and a set of document metadata values. A document navigation computer may receive information from a user associated with the enterprise, and, based on the information received from the user and document metadata values, dynamically create a sub-set of the documents in the risk relationship data document data store. An interactive user interface display computer may provide indications associated with the documents in the dynamically created sub-set to the user via an interactive user interface and receive a selected document of the dynamically created sub-set. The user interface display computer may then, responsive to the selection, deliver the selected document to a remote user device.

25 Claims, 19 Drawing Sheets

(56) References Cited

U.S. PATENT DOCUMENTS

| | | | |
|---|---|---|---|
| 2003/0156133 A1* | 8/2003 | Martin | H04M 15/00 715/747 |
| 2005/0021360 A1* | 1/2005 | Miller | G06Q 10/08 705/7.28 |
| 2005/0114829 A1* | 5/2005 | Robin | G06Q 10/06 717/101 |
| 2008/0052135 A1* | 2/2008 | Ziade | G06Q 40/08 705/4 |
| 2008/0181516 A1* | 7/2008 | Jackson | G06Q 10/10 382/236 |
| 2008/0201643 A1* | 8/2008 | Nagaitis | H04L 67/22 715/738 |
| 2009/0055338 A1* | 2/2009 | Kellogg | G06Q 30/0629 706/46 |
| 2009/0125403 A1* | 5/2009 | Li | G06Q 30/0224 705/14.25 |
| 2009/0276419 A1* | 11/2009 | Jones | G06F 16/3322 |
| 2010/0030734 A1* | 2/2010 | Chunilal | G06Q 10/10 707/770 |
| 2011/0281246 A1* | 11/2011 | Brunacini | G09B 19/003 434/219 |
| 2015/0067606 A1* | 3/2015 | Everette | G06F 3/04842 715/834 |
| 2015/0169595 A1* | 6/2015 | Zagoudis | G06Q 10/00 707/694 |
| 2015/0178851 A1* | 6/2015 | Dutt | G06Q 40/08 705/4 |
| 2016/0080422 A1* | 3/2016 | Belgodere | G06N 5/046 706/47 |
| 2016/0275453 A1* | 9/2016 | Powers | G06F 3/0482 |
| 2016/0321589 A1* | 11/2016 | Powers | G06F 16/26 |
| 2016/0379222 A1* | 12/2016 | Chauhan | G06F 16/288 705/304 |
| 2017/0052652 A1* | 2/2017 | Denton | G06F 16/248 |
| 2017/0060873 A1* | 3/2017 | Rathod | G06Q 10/06 |
| 2017/0154114 A1* | 6/2017 | Lehodey | G06F 16/24578 |
| 2017/0344209 A1* | 11/2017 | Gordon | G06F 3/04842 |
| 2018/0129989 A1* | 5/2018 | Bowers | G06Q 10/0635 |
| 2018/0301222 A1* | 10/2018 | Dew, Sr. | G06F 16/9577 |
| 2018/0329587 A1* | 11/2018 | Ko | G06F 3/0485 |
| 2018/0335939 A1* | 11/2018 | Karunamuni | G06F 9/445 |
| 2019/0028588 A1* | 1/2019 | Shinseki | G06Q 10/10 |
| 2019/0102430 A1* | 4/2019 | Wang | G06F 16/367 |
| 2019/0339855 A1* | 11/2019 | Walkin | G06F 3/0485 |
| 2019/0340518 A1* | 11/2019 | Merrill | G06F 16/908 |
| 2020/0142545 A1* | 5/2020 | Wald | G06F 3/0482 |
| 2020/0342462 A1* | 10/2020 | Todd | G06F 40/205 |

* cited by examiner

SYSTEM TO FACILITATE GUIDED NAVIGATION OF DIRECT-ACCESS DATABASES FOR ADVANCED ANALYTICS

BACKGROUND

In some cases, an enterprise might store a vast amount of information as documents in one or more databases. Moreover, users of the enterprise (e.g., employees) may need to periodically access particular documents as they perform their day-to-day tasks. For example, an actuary working for an insurance company might need to access documents containing claim loss data, insurance premiums, etc. Navigation to the appropriate document, however, can be time consuming and error prone tasks—especially when there a substantial number of documents (and might not even be possible for substantially large and/or old institutions). For example, documents might be stored in a hierarchical tree or file structure that requires a user to make many selections before eventually reaching the needed information.

Using software to guide users is a well-established design in the technology industry. A simple example is installing basic software on a home computer using a wizard interface. Having highly educated users with advanced domain knowledge who need to navigate complex data assets is a well-established challenge for humanity. Such domains typically include things such as medicine and the sciences. Large insurance organizations with complex data assets that must be utilized by actuaries, underwriters, and those of similar skill is also a complex domain, and such users have advanced expertise that they must apply as they navigate the data assets.

It would be desirable to provide systems and methods to accurately and efficiently facilitate risk relationship document navigation for an enterprise, while allowing for flexibility and effectiveness when creating, reviewing, and/or monitoring navigation paths as appropriate. Another desirable goal would be to bring the simplicity of a guided software navigation experience to complex insurance data assets in a way designed to optimize those with strong domain expertise.

SUMMARY OF THE INVENTION

According to some embodiments, systems, methods, apparatus, computer program code and means are provided to facilitate risk relationship document navigation for an enterprise. In some embodiments, a risk relationship document data store may contain a set of electronic data records, each electronic data record being associated with a risk relationship document and including a document identifier and a set of document metadata values. A document navigation computer may receive information from a user associated with the enterprise, and, based on the information received from the user and document metadata values, dynamically create a sub-set of the documents in the risk relationship data document data store. An interactive user interface display computer may provide indications associated with the documents in the dynamically created sub-set to the user via an interactive user interface and receive a selected document of the dynamically created sub-set. The user interface display computer may then, responsive to the selection, deliver the selected document to a remote user device.

Some embodiments comprise: means for receiving, at a document navigation computer, information from a user associated with the enterprise; means for accessing, from a risk relationship document data store, electronic data records, each electronic data record being associated with a risk relationship document and including a document identifier and a set of document metadata values; based on the information received from the user and document metadata values, means for dynamically creating a sub-set of the documents in the risk relationship data document data store; means for providing, from an interactive user interface display computer, indications associated with the documents in the dynamically created sub-set to the user via an interactive user interface; means for receiving, via the interactive user interface, a selected document of the dynamically created sub-set; and responsive to the selection, means for delivering the selected document to a remote user device.

In some embodiments, a communication device associated with a back-end application computer server (e.g., associated with a document navigation computer) exchanges information with remote devices. The information may be exchanged, for example, via graphical user interfaces and public and/or proprietary communication networks.

Some technical effects of some embodiments of the invention are improved and computerized ways to accurately and efficiently facilitate document navigation for an enterprise. With these and other advantages and features that will become hereinafter apparent, a more complete understanding of the nature of the invention can be obtained by referring to the following detailed description and to the drawings appended hereto.

DETAILED DESCRIPTION

The present invention provides significant technical improvements to facilitate electronic messaging and dynamic data processing. The present invention is directed to more than merely a computer implementation of a routine or conventional activity previously known in the industry as it significantly advances the technical efficiency, access and/or accuracy of communications between devices by implementing a specific new method and system as defined herein. The present invention is a specific advancement in the area of one or more electronic data record management and navigation by providing benefits in data accuracy, data availability, and data integrity and such advances are not merely a longstanding commercial practice. The present invention provides improvement beyond a mere generic computer implementation as it involves the processing and conversion of significant amounts of data in a new beneficial manner as well as the interaction of a variety of specialized client and/or third-party systems, networks, and subsystems. For example, in the present invention information may be processed, managed, and/or used to navigate risk relationship documents, such as by deploying and/or using computing components, and results may then be analyzed accurately and used to fine tune the navigation paths, thus improving the overall performance of an enterprise (e.g., by improving the effectiveness of user searches and/or reducing the number of navigation paths that need to be processed via a network and/or communication links). Moreover, embodiments might further improve performance values, response times, resource allocation decisions, etc.

Figure 1:
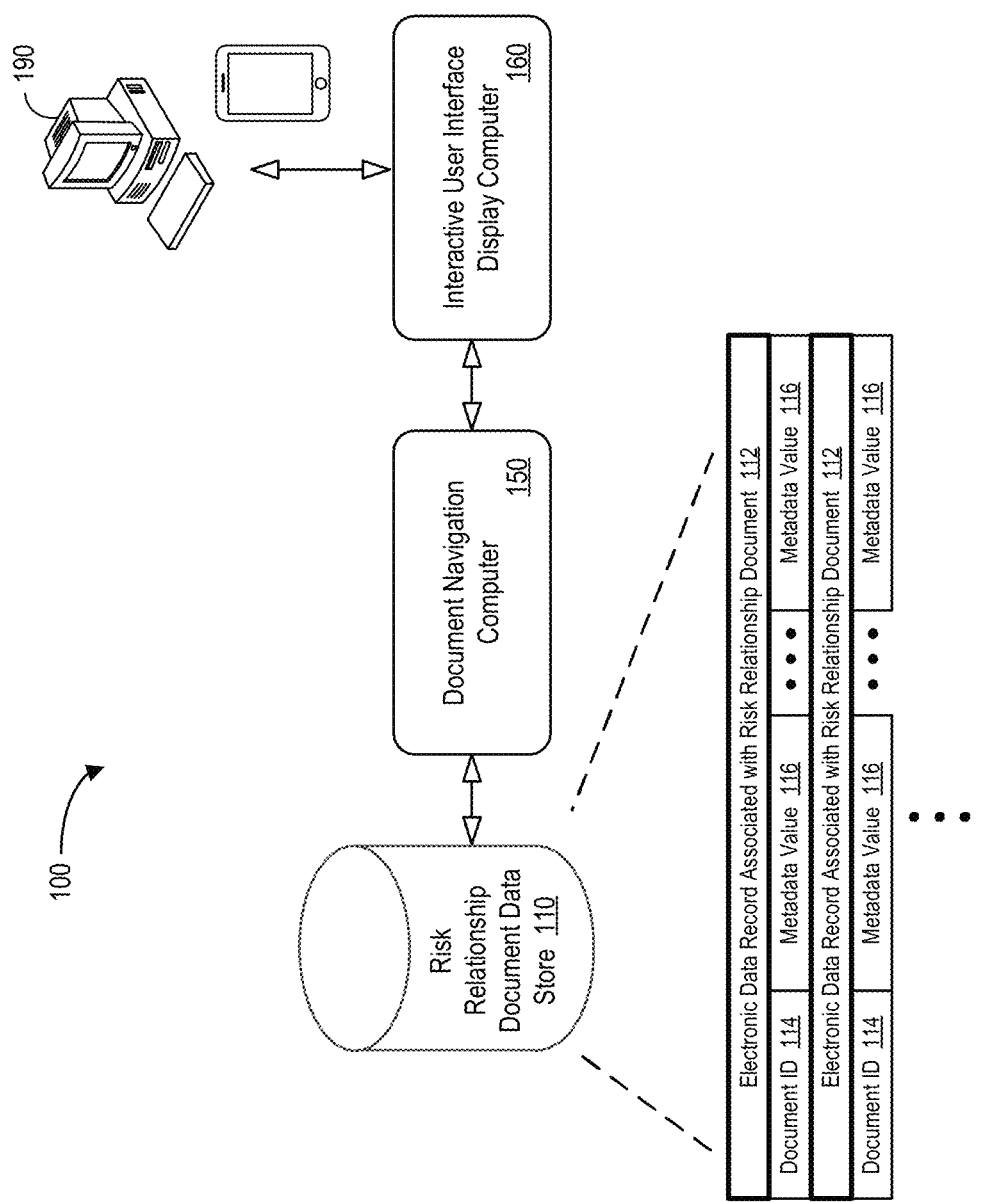
FIG. 1 is a high-level block diagram of an enterprise system according to some embodiments.

It would be desirable to provide systems and methods to accurately and efficiently facilitate "document" navigation for an enterprise, while allowing for flexibility and effectiveness when creating, reviewing, and/or monitoring navigation paths as appropriate. As used herein, the term "document" may refer to, for example, any text document, electronic file, image, video, query, spreadsheet, etc. FIG. 1 is a high-level block diagram of a system 100 according to some embodiments of the present invention. In particular, the system 100 includes a risk relationship document data store 110 containing electronic records 112, including document identifiers 114 and metadata values 116.

A document navigation computer 150 is coupled to the risk relationship document data store 110 and an interactive user interface display computer 160. In turn, the interactive user interface display computer 160 exchanges information with one or more remote user devices (e.g., via a firewall). According to some embodiments, a back-end application computer server (e.g., associated with the document navigation computer 150) and/or a remote user terminal may facilitate viewing, receiving, and/or interacting with risk relationship documents. Moreover, a central repository (not illustrated in FIG. 1) might be used to store the results of such document accesses and/or associated navigation paths. According to some embodiments, the document navigation computer 150 (and/or other devices described herein) might be associated with a third party, such as a vendor that performs a service for an enterprise.

The document navigation computer 150 and/or other devices described herein might be, for example, associated with a Personal Computer ("PC"), laptop computer, smartphone, an enterprise server, a server farm, and/or a database or similar storage devices. According to some embodiments, an "automated" document navigation computer 150 may automate guided navigation of risk relationship documents based on electronic data records in the risk relationship document data store 110. As used herein, the term "automate" may refer to, for example, actions that can be performed with little (or no) intervention by a human.

As used herein, devices, including those associated with the document navigation computer 150 and/or any other device described herein may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The document navigation computer 150 may store information into and/or retrieve information from the risk relationship document data store 110. The risk relationship document data store 110 might, for example, store electronic records associated with various insurance documents, including, for example, document identifiers 114, characteristic values (e.g., associated with inputs, outputs, business rules or logic, etc.), metadata values 116, etc. The risk relationship document data store 110 may be locally stored or reside remote from the document navigation computer 150. As will be described further below, the risk relationship document data store 110 may be used by the system 100 to help navigate and manage navigation paths for an enterprise. Although a single document navigation computer 150 is shown in FIG. 1, any number of such devices may be included. Moreover, various devices described herein might be combined according to embodiments of the present invention. For example, in some embodiments, the risk relationship document data store 110 and/or document navigation computer 150 might be co-located and/or may comprise a single apparatus.

Figure 2:
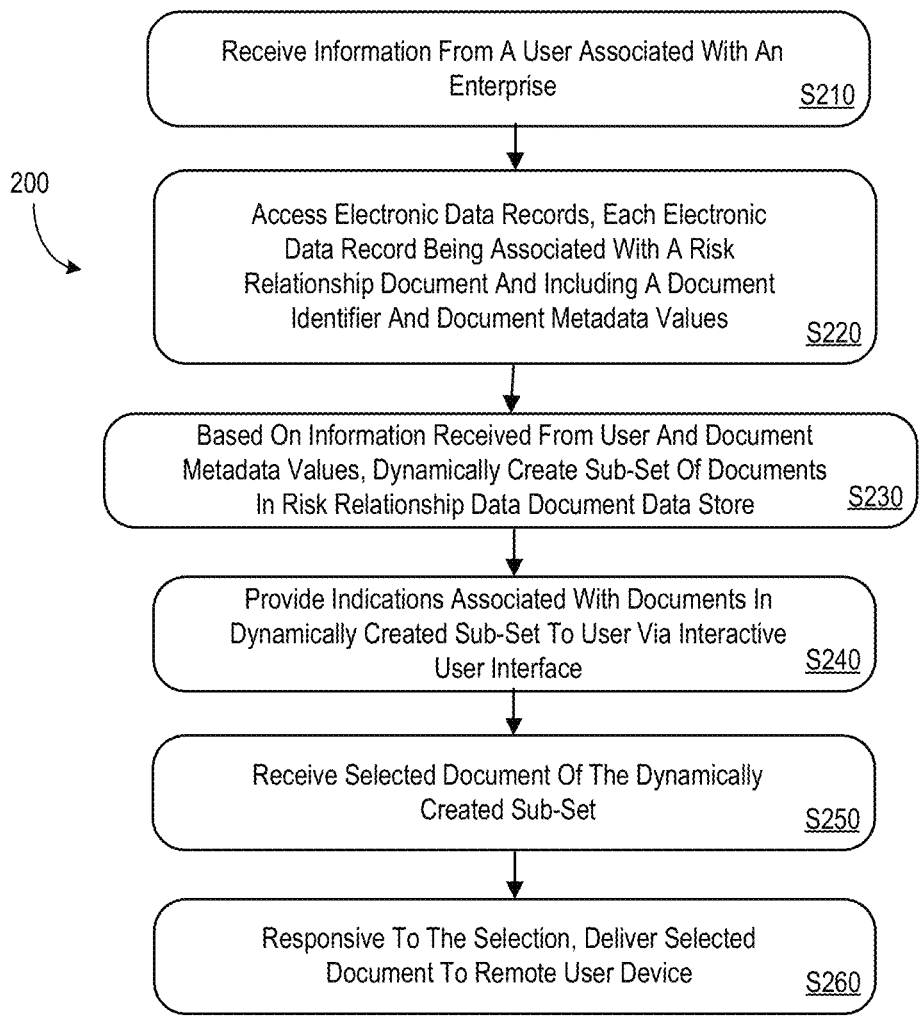
FIG. 2 illustrates an automated risk relationship document navigation method according to some embodiments.

The system 100 of FIG. 1 is provided only as an example, and embodiments may be associated with additional elements or components. According to some embodiments, the elements of the system 100 may automatically facilitate navigation of risk relationship documents for an enterprise. For example, FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a document navigation computer may receive information from a user associated with the enterprise. For example, a user might indicate that he or she is an underwriter who is about to perform a specific task. At S220, the system may access, from a risk relationship document data store, electronic data records. According to some embodiments, each electronic data record is associated with a risk relationship document and including a document identifier and a set of document metadata values.

Based on the information received from the user and document metadata values, at S230 the system may dynamically create a sub-set of the documents in the risk relationship data document data store. At S240, an interactive user interface display computer may provide indications associated with the documents in the dynamically created sub-set to the user via an interactive user interface. For example, the display might include the names of ten documents that are most frequently accessed when underwriters begin that particular task. At S250, the interactive user interface may receive a selected document of the dynamically created sub-set (e.g., he or she might "click" on the name of the document). Responsive to the selection, at S260 the system may deliver the selected document to a remote user device.

Figure 3:
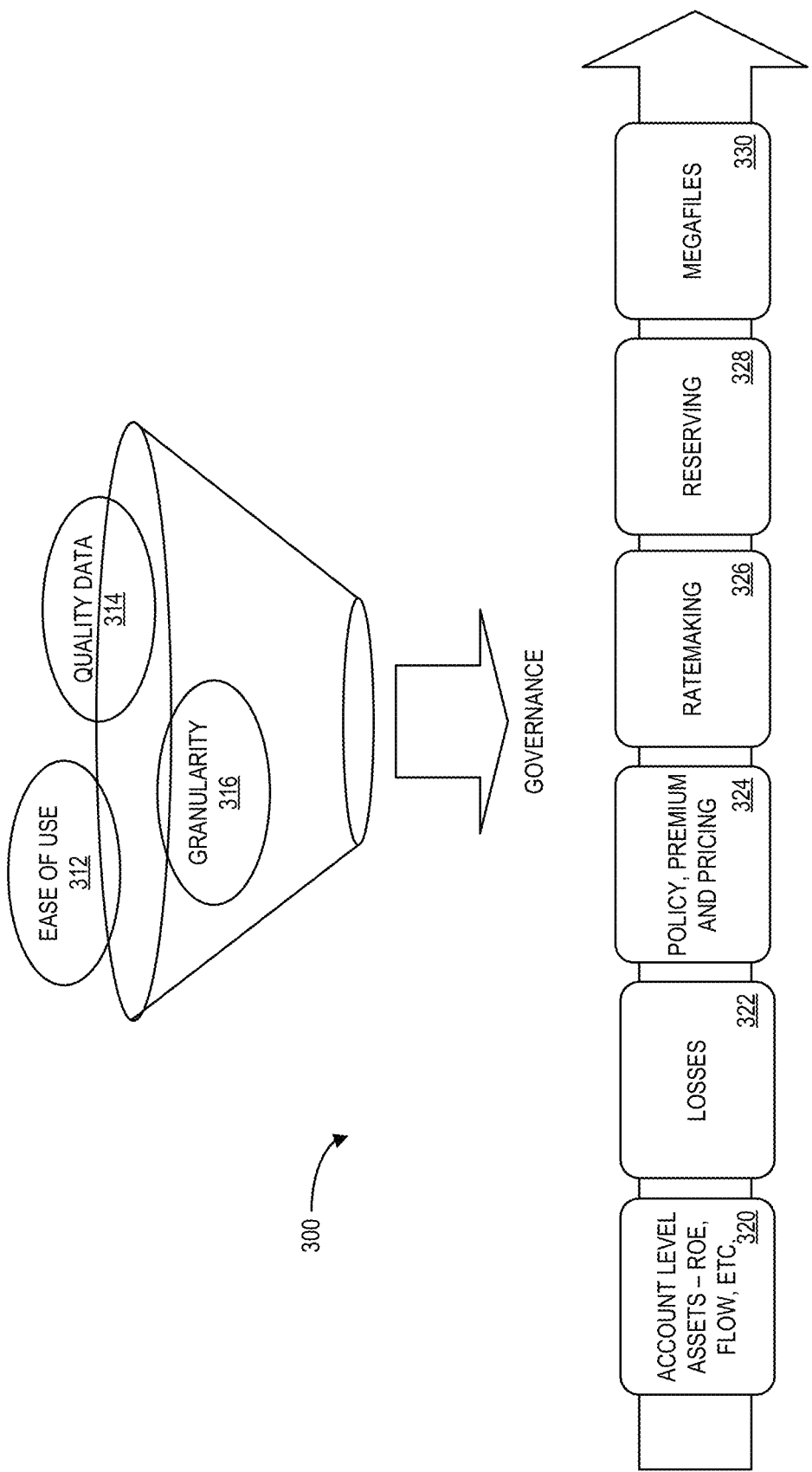
FIG. 3 is an example of an actuarial delivery layer for document navigation in accordance with some embodiments.

FIG. 3 is an example of an actuarial delivery layer 300 for document navigation in accordance with some embodiments. Although an actuarial delivery layer 300 for documents is described herein as an example, note that embodiments may be associated with any other type of guided navigation system or tool for knowledge artifacts. The actuarial delivery layer 300 might, for example, be associated with a centralized database that contains attributes, metrics, and any other data that is required to perform actuarial work that constitutes between 80% and 90% of data needs for an actuary (as opposed to business intelligence and/or information for data scientists). The layer 300 might combine appropriates amounts of ease of use 312, quality data 314, and/or granularity 316 to allow for effective governance of the system. Overall, account level assets 320, losses 322, policy, premium and pricing information 324, ratemaking values 326, reserving data 328, and megafiles 330 of information might accessed by an actuary as they perform their duties.

Figure 4:
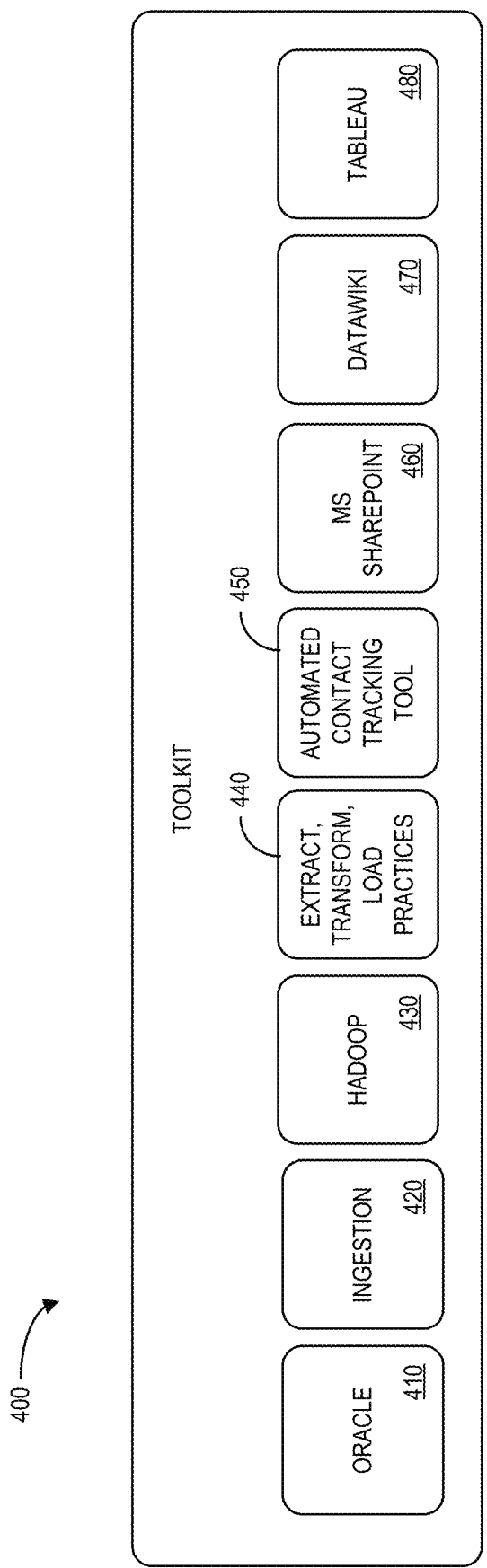
FIG. 4 is an example of an actuarial delivery layer tools tack according to some embodiments.

FIG. 4 is an example of an actuarial delivery layer tool stack 400 according to some embodiments. The tool stack 400 might include an Oracle® database 410, an ingestion process 420, Hadoop 430 for large data, Extract, Transform, and Load ("ETL") practices 440, an automated contact tracking tool 450, Microsoft® SharePoint storage 460, a datawiki 470, and/or tableau information 480.

Figure 5:
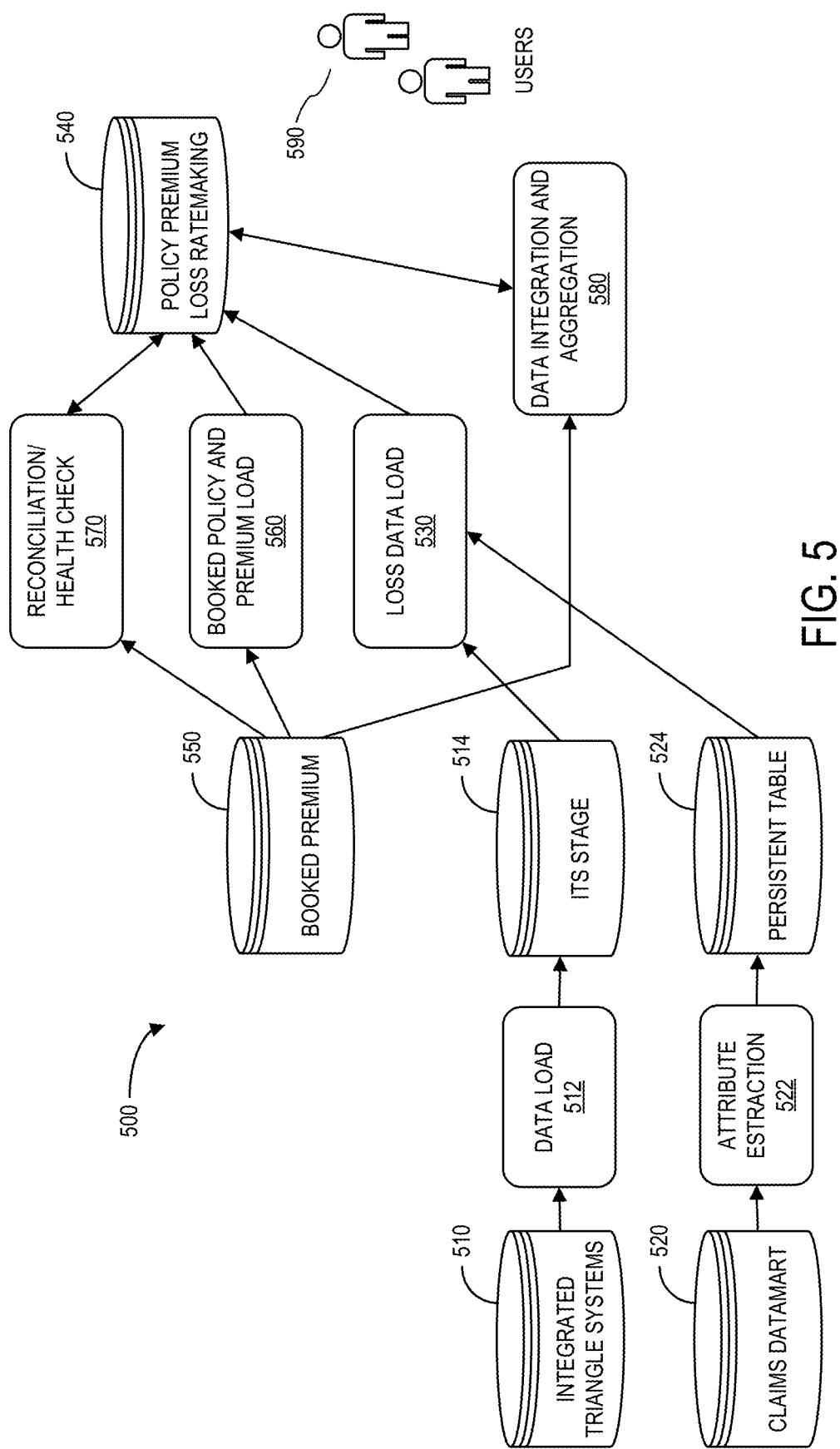
FIG. 5 is a high-level process flow in accordance with some embodiments.

FIG. 5 is a high-level process flow in 500 accordance with some embodiments. Integrated Triangle Systems ("ITS") 510 information may be stored in an ITS stage 514 via a data load 512. Information from a claims datamart 520 (e.g., associated with an Enterprise Claims Operating System ("ECOS")) may be stored in a persistent table 524 via attributes extraction 522. Loss data load 530 may receive information from the ITS stage 514 and the persistent table 524 and store loss results into a policy premium loss ratemaking database 540 to be accessed by users 590. Information originating in a booked premium database 550 may also be stored into the policy premium and loss ratemaking database 540 after being processed by a reconciliation and health check process 570 (in connection with control reports), a booked policy and premium load 560 (e.g. policy and premium data), and a data integration and aggregation process 580 (e.g., ratemaking data).

Embodiments may be directed to a system to facilitate the navigation of information in an enterprise. Embodiments may position all types of data persons to build and work with a repository of data knowledge (metadata) in a highly dynamic way. When any information on data needs to be shared, updated or communicated, whether a data person needs to be educated, whether a data person needs to educate, whether a data person needs to be notified, whether a data person needs to be enabled the navigation system will assist the data person in achieving their goal.

In some embodiments, a navigation engine uses product structures, line of business classifications business segment, data subject, and similar proprietary structures to facilitate navigation of insurance companies. If the structures do not exist within the system, the data user has the ability to add said structure to the system. If the structures do not exist, the system may have the ability to programmatically update the structure based on other submitted metadata and look up table's stores in a Relational DataBase Management System ("RDBM").

Embodiments may connect users to an enterprise identify system to extract organizational affiliations used by the navigation engine to guide users. This lets the system connect user habits to other users in similar structures within the organization. Thus, the system programmatically prompts the user to the most likely piece of insurance data knowledge that the user is searching for. Additionally, the connection of organizational structures may allow data persons to collaborate with one another based on both data use and insurance organization affiliation.

Embodiments may utilize tags underlying data assets at a schema, table, column, and/or cell level as needed to allow for recommendations by the navigation engine based on the parallel ontology of users. Thus, the data person does not need access to the underwriting asset, instead they simply need to use the navigation engine to tag the assets which can be propagated down if necessary. As the number of tags increase and the user base expands the programmatic engine can enhance its recommendations pattern as new insurance users are added.

Embodiments may allow for the tagging of users with a parallel ontology (e.g., a set of concepts and/or categories in a subject area or domain that shows their properties and relations) between user and data assets, user and organization structure, user and all other metadata that is stored within the system, etc. This tagging and connection ultimately may feed to the programmatic direction of data person and insurance user behavior as they operate within the navigation system.

Embodiments may allow the tagging ontologies to be persisted to the underlying data store in industry standard technologies that allow for software other than the current system to utilize the data for extended analysis, design, and implementation around the enterprise. Data persons can therefore leverage this tagging not only in the navigation system but in further actuarial or underwriting practices as the needs apply.

Embodiments may gather all data elements from any point in the navigation path and store it to an industry standard data repository that serves as input to a general purpose Artificial Intelligence ("AI") engine for recommendations for continual improvement either programmatically or through the intervention of human beings trained in data services. As used herein, the phrase "AI" may refer to any type of logic or programming that helps lead to a decision or result. For example, an AI engine might comprise an algebraic function, a set of business rules and/or logic (e.g., implemented via a spreadsheet application), Machine Learning ("ML"), supervised or semi-supervised learning, unsupervised learning, reinforcement learning, feature learning, sparse dictionary learning, anomaly detection, decision trees, association rules, models, artificial neural networks, support vector machines, Bayesian networks, genetic algorithms, etc. Further serving the programmatic intelligence engine which services to further enhance the guided navigation engine for data users.

Embodiments may provide data users the ability to design and structure new data elements to be implemented and used in insurance business processes and functions employing the guided navigational functions. If users are not assisted by the programmatic design or path, they can further refine the system by customizing the path in which they take through the system. These refinements are sent to the programmatic engine to determine if further refinements can be made to the algorithm employed.

Embodiments may let data users administer, create, and/or maintain the documentation of underlying data assets. As the navigation engine guides users, users have the ability to update documentation on the underlying data asset. These updates are then retained to an industry storage device to be reused by future users of the navigation engine. Additionally, where applicable these documentation updates are propagated to the underlying data asset for actuaries, underwriters, and other users to leverage in their insurance function.

Embodiments may be associated with a Graphical User Interface ("GUI") and navigational paths which can be redesigned by users based on intended use and preference. Data users can change themes such as color and orientation of web parts. Data users can also change the order in which they see prompts. In cases where navigational prompts are not relevant to users they can remove prompts to speed their use of the system via the GUI. In other cases, users can add new GUI navigational prompts which can be saved to the system and software. Administers of the software can then choose to promote these new GUI features for all users.

Embodiments may let users review and affiliate themselves with profiles of other users to facilitate the reuse of similar user experiences based on such self-defined role identification. This is helpful when a new user does not want to wait for the programmatic engine to automatically relate them to a current user.

Embodiments may provide an ability to reuse classified user role experiences to facilitate the prevention of user errors. The programmatic navigational engine will self-correct users who manually change their chosen path. Additionally, classifications may include but not be limited to, new user, moderate user, super user, etc. The role classifications and the way in which the programmatic engine determines what user classification you fall into is determined by the underlying navigational software, presets, and thresholds which can be automatically or manually administered.

Embodiments may monitor user's behaviors to routinely redesign the GUI and navigational paths within the navigation engine to guide users, persisting these redesign changes to disk. User click traffic is monitored and analyzed by the programmatic engine to continue to refine and enhance the design. Specific weights are applied to click path based on your user role. New user click path is provided less weight than a super user. As new GUIs and screens and users are added the click path is redesigned accordingly.

Embodiments may allow for escalation and reporting of data issues through a standard issue or incident management system based on the parallel ontology for users. As users review data documentation they can determine that an underlying data asset has a data issue and submit an issue or incident for the support team of the underlying data asset to review and act on. This issue will also be attached to the data documentation in the navigation system.

Embodiments may provide navigation engines an asynchronous tool to the users to electronically exchange data content thoughts, theories and questions using discussion threads. Users leveraging the navigation system may determine that further elaboration or documentation on the data asset is needed and they can submit the question to the larger user community. The programmatic engine can take these submissions and programmatically direct them to the user who can best answer them based on their role (new user, super user) or based on their organizational structure, or based on their past use of the system such as they have answered many questions in the past. The system might also let administrators of the system continually refine the way in which questions are directed to users of the system.

Embodiments may let a navigation engine track an asynchronous tool's top contributors and display the list electronically. The system can use this list to determine based on its connection to the corporate directory to alert users of changes and updates or notify future potential users of what the system provides.

Embodiments may routinely validate and change data asset documentation based on user comments and direct connection to underlying data assets. As users comment these comments can be reviewed manually or programmatically to update the GUI or data asset documentation. Additionally, users can be notified of these updated based on its connection to the corporate directory.

Embodiments may collect user feedback to routinely redesign the GUI and navigational paths to guide users. This feedback can be collected in writing, through programmatic changes, comments, discussion boards, use, and addition of underlying data assets, addition of data documentation, issues and incidents.

Embodiments may retrieve some or all of the underlying business data assets for the purpose of guiding the navigation path either through user feedback or artificial intelligence. The user administrators can allow for the crawl the network to determine available data assets where by the system can connect to them and pull in the underlying information. This new information then updates the GUI and navigational system to refine and aid the navigational path of users in the future.

Embodiments may let users review the navigation paths of other users and store an affiliation of themselves with such navigation paths for their own use. Users can be directed based on org structure, comments, discussions, incidents, etc. to the users in which they can most likely affiliate themselves with.

Embodiments may scan data dictionaries of the underlying data assets as a mechanism for populating user navigation paths and presenting them to the users for selection. As the scans complete and the information is brought in this will programmatically change the user navigational paths, GUIs, and other available content within the navigational system.

Embodiments may use persistent data in disk and artificial intelligence engine to communicate the health of data assets through outbound communication systems. The health can be based on user use, completeness of documentation, open issues or incidents, design of the underlying data asset. The communication systems can be designed around the org structures and repository of users.

Embodiments may use subscription information, navigation history and/or an artificial intelligence engine to customize outbound communication to users based on relevancy. Users can subscribe to other users or data assets, the system can review the use of data users and the path most commonly taken by programmatic or manual use, and the artificial intelligence engine can leverage existing data of underlying assets, past use, issues or incidents to ultimately customize the flow of outbound communications such as the direction or users or notification of relevant data information.

Embodiments may identify data subject matter experts based on stamps applied to their use navigating future users through the most direct path based on their request. Subject matter experts can be identified based on comments or questions submitted, issues or incidents submitted or solved, population of data documentation, customizations applied to the GUI, manually identified by the user administrators. The system can then apply learned paths to new users, new users can apply subject matter paths to themselves, or user administrators can propagate these paths to other users such as new users.

Embodiments may recommend users to subject matter experts who can help resolve data issues faster and can contribute in talent development across the organization. As users submit issues or incidents the system can connect the submitting user to a subject matter expert based on contributions (e.g., contributions made to discussions on an asynchronous tool) and use of the navigation system in the past. Additionally, system administrators can manually recommend subject matter experts based on the review of the submitted issue.

Figure 6:
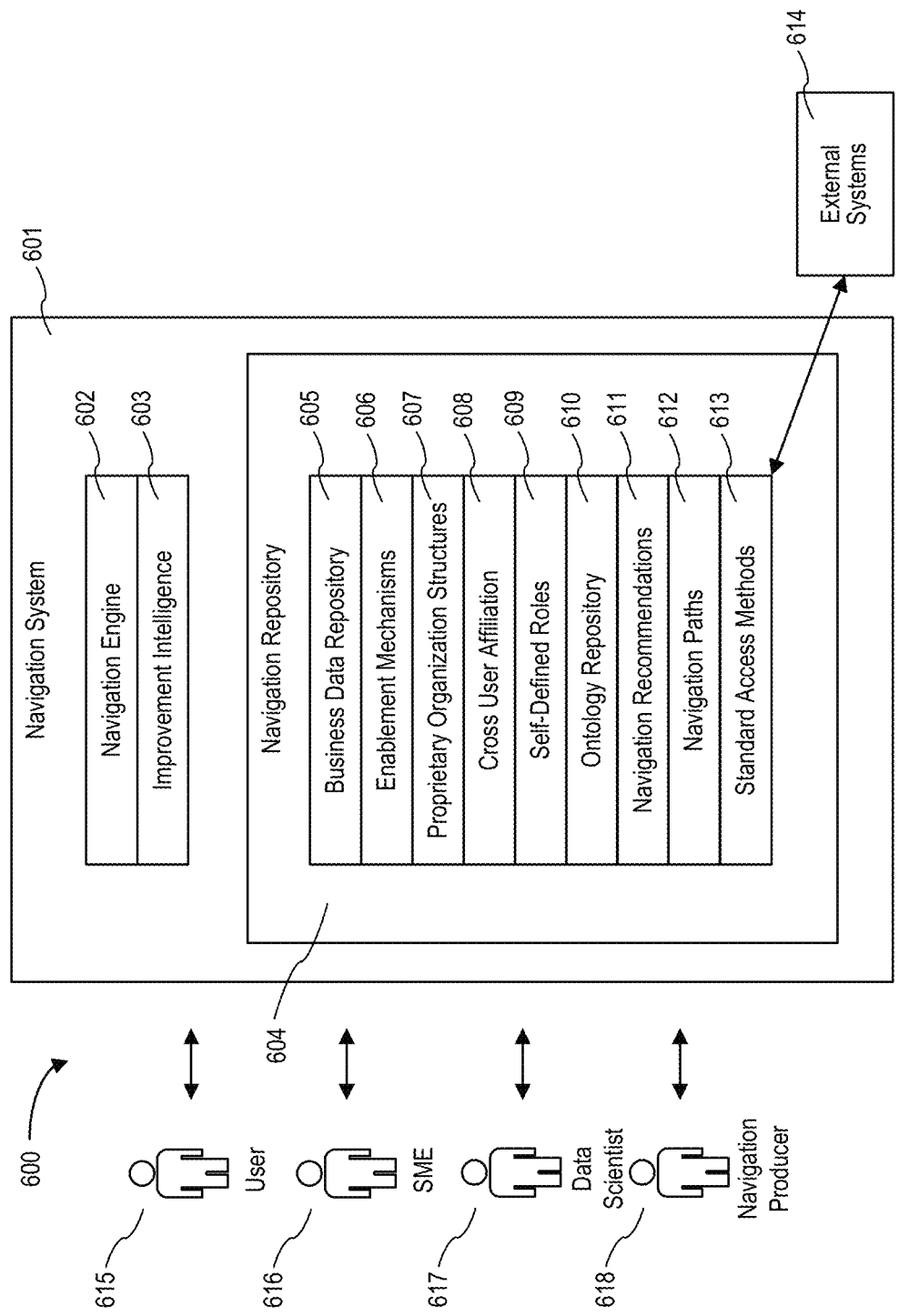
FIG. 6 illustrates the use of a navigation system containing a navigation repository with connection to various user interaction and external systems according to some embodiments.

FIG. 6 illustrates 600 the use of a navigation system 601 containing a navigation repository 604 with connection to various user interaction and external systems according to some embodiments. The navigation system 601 is the software that allows for the guided navigation of insurance users. The navigation system 601 has a navigation engine 602 that directs insurance users 615 to the data asset information that they seek. The improvement intelligence 603 is the programmatic and artificial intelligence engine that continues to enhance and guide insurance users to the data asset information.

The navigation system 601 contains a navigation repository 604 which persists all of the data asset information, navigation engine, and improvement intelligence to disk. The navigation repository 604 also has enablement mechanisms 606. These enablement mechanisms 606 include things such as GUI changes, navigation paths, and discussion boards, structured taxonomies, rating of user experience, issue and incident management. The navigation repository 604 contains the insurance enterprise proprietary organizational structure 607. The enterprise proprietary organizational structure 607 is a combination of its vertical and horizontal alignments which are used by the navigation engine 602 to create navigational paths and systems to guide the user. Additionally, the proprietary organization structure 607 can be used to categorize data and documentation based on the organization horizontal or vertical. The navigation repository 604 enables cross user affiliation 608 so that the profile or pieces of the profile can be shared among navigation system 601 users. The Navigation repository 604 enables self-defined roles 609 in the event a user does not like the programmatically leaned and enabled role assigned, they are able to define their own role based on need and experience. The navigation repository 604 provides an ontology repository 610 to connect users to data documentation, data alerts, and data documentation. The navigation repository 604 provides navigation recommendations 611 based on learned behavior through an artificial intelligence engine. The navigation recommendations 611 engine trains based off of user commands and can be manually edited as user administrators see fit. The navigation recommendations 611 engine can also be turned off at a user's discretion. The navigation repository 604 persists navigation paths 612 based on training from other uses paths. These navigation paths 612 are trained and learned by the artificial intelligence engine through a combination of user behavior, proprietary organizational structures 607, self-defined roles 609, and/or other enablement mechanisms 606. The navigation repository grants and restricts access and user behavior based on standard access methods 613 based on external systems 614 used to manage access and provisioning. Users 615, commonly referred to as data users or just as users throughout this document enter the navigational system 601 and its components via a web browser. The navigation system 601 accepts inputs from the user 615 and provides back information via the GUI. A Subject Matter Expert ("SME") 616 operates similarly to a user 615. However, the navigation engine 602 and improvement intelligence 603 provide additional weight to the behaviors of a SME 616. The SME 616 can be tagged either manually or automatically based on the use of the navigation system 601. Data scientists 617 enter the navigational system 601 and its components via a web browser. The navigation system 601 accepts inputs from the data scientist 617 why by the data scientist is entering commands to influence their external systems 614 such as statistical models. Navigation producers 618 enter the navigation system 601 providing inputs to alter the navigation engine 602, improvement intelligence 603, or the navigation repository 604 and its components. Navigation producers 618 are commonly referred to as administrators throughout this document.

Figure 7:
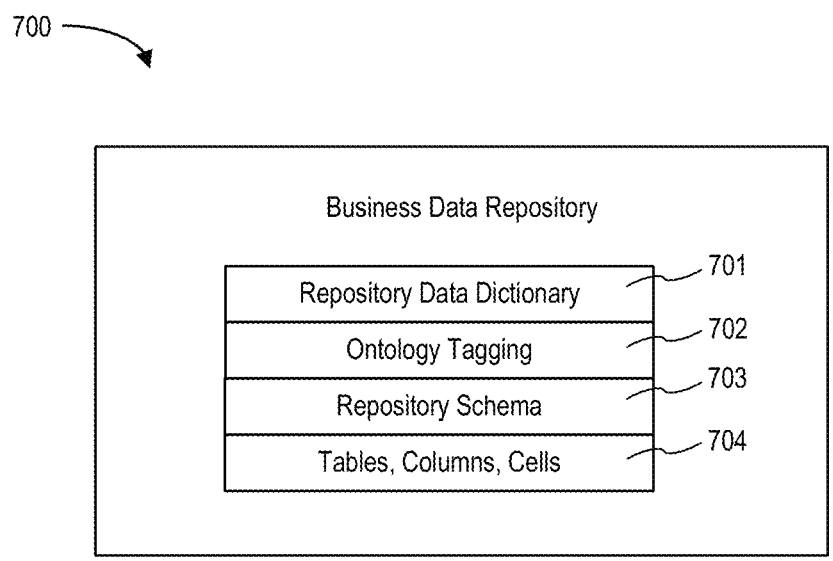
FIG. 7 illustrates a system that facilitates a business data repository within a system in accordance with some embodiments.

FIG. 7 illustrates a system that facilitates a business data repository 700 within a system in accordance with some embodiments. The business data repository 700 is a critical part of the navigation system 601 navigation repository 604. The business data repository 700 consists of multiple critical components. The repository data dictionary 701 stores business information in plain English such as name of the column, definition of the column, valid values, ability to attach and reference the repository schema 703 and tables, columns, and cells 704. The repository data dictionary 701 is searchable via plain text search. Ontology tagging 702 can be used to tag components of the business data repository 700 among each other. Additionally, the ontology tagging 702 can be used to tag users 615, SME 616, data scientists 617, and navigation producers 618.

Figure 8:
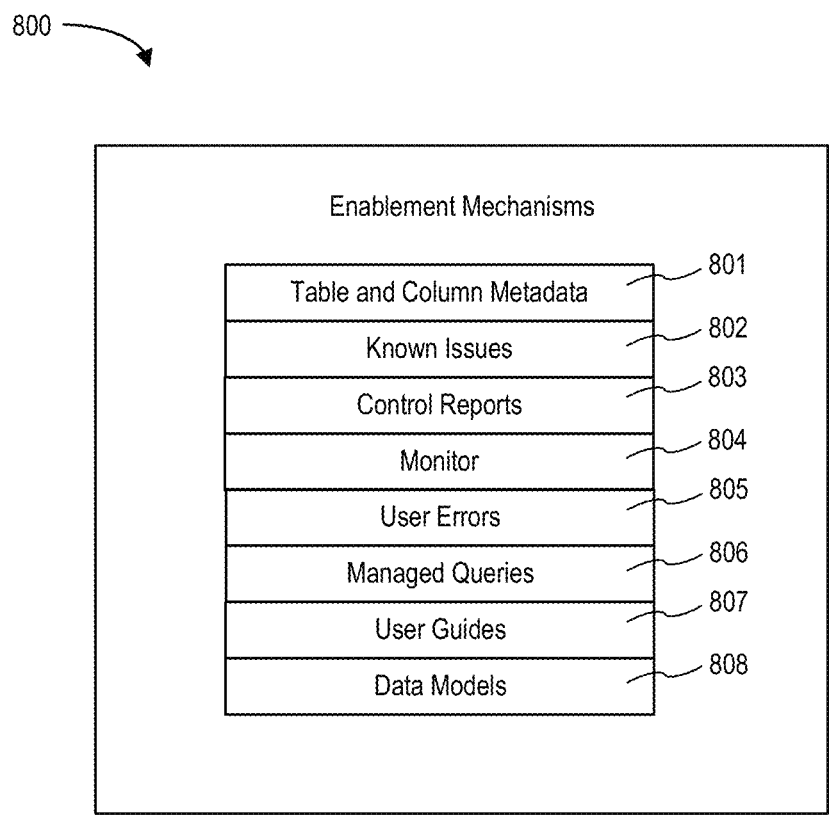
FIG. 8 illustrates a system that facilitates user interaction enablement within a system according to some embodiments.

The navigation system 601 navigation repository 604 also provides enablement mechanisms 606 to the various users 615 of the methods and system. FIG. 8 illustrates a system that facilitates user interaction enablement within a system according to some embodiments. These enablement mechanisms 800 consist of table and column metadata 801 which is data about parent schema and database tables that includes table and column business definitions, transformation logic, one-hop lineage, valid values, originating source names, etc., known issues 802 which are reports on temporary data issues including issue description, resolution, scope and Estimated Time of Arrival ("ETA") for fixes, provided in the system and leverage the ontology tagging 702 in the business data repository 700, control reports 803 which report on the health of the data being used, monitor 804 enables the system by continuously monitoring the quality of data control reports that include target to source data reconciliation reports, and orphan reporting that ensure keys from child tables are in parent tables on a defined period of time (e.g., daily, weekly, monthly, etc.). User errors 805 are prompts provided by the navigation system 601 when the user makes a mistake navigating the systems navigation repository 604. Managed queries 806 allow the users to upload standard queries and sample output based on the business context. User guides 807 are written process documentations for users 615 to get up to speed on a data asset providing information such as intended audience, data sources, data usability, connection information, joining data with other system, conceptual model, authoritative sources within the RDMS, permanent data issues, data history and major breaks in history that caused a behavior change in the data, update frequency, grain, reconciliation and approach for snapshotting, etc. Data models 808 provide an abstract model that shows tables and the elements structure content, keys, grain and relationships to other data entities for a user 615.

Figure 9:
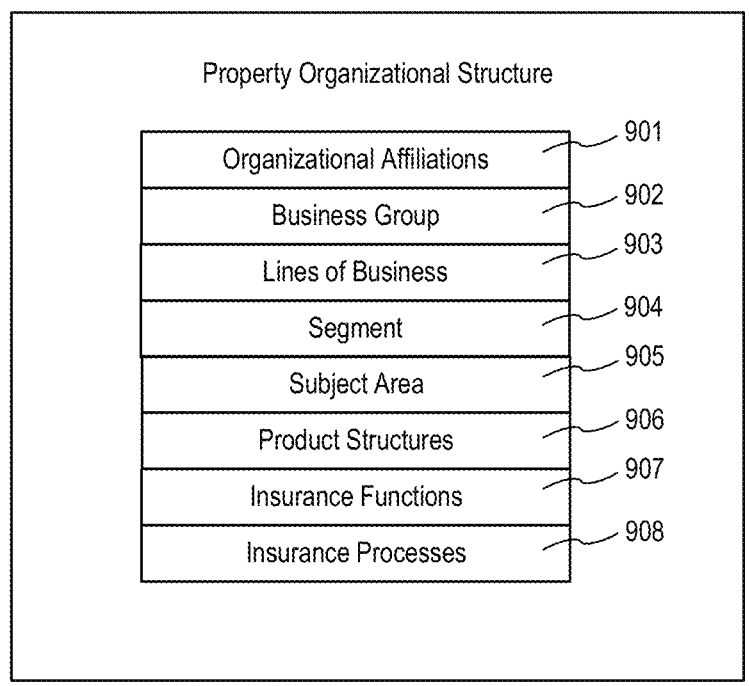
FIG. 9 illustrates a system that facilitates organizational structures within a system in accordance with some embodiments.

The proprietary organizational structure 607 is part of the navigation system 601 navigation repository 604. FIG. 9 illustrates a system that facilitates organizational structures within a system in accordance with some embodiments. The proprietary organizational structures 900 consist of multiple horizontal and verticals of a typical Property and Casualty ("P&C") insurer or any other insurer. The components consist of organizational affiliations 901 such as those to major partnerships external to the company (e.g. AARP, Pets 'R' us, and Cyclists of America), business groups 902 within the company such as marine and auto within the commercial lines. Lines of business 903 in a typical property and casualty insurer can consist of some variation of a personal or commercial lines insurer including auto, general liability, workers compensation, property, etc. Segments 904 would be a breakdown of the line of business such as small commercial, middle markets, and large commercial. Subject area 605 relate to important data concepts of lines of business 903 and segment areas 904 which consist of items like insurance premium, policy, losses, reserving, ratemaking, etc. Product structures 906 consist of items such as auto or composite auto. Insurance functions 907 consist of back-end functions of an insurer such as finance, managed file transferring, data operations, and other shared services. The insurance processes 908 consist of items such as reinsurance, rating, and risk ranking.

Figure 10:
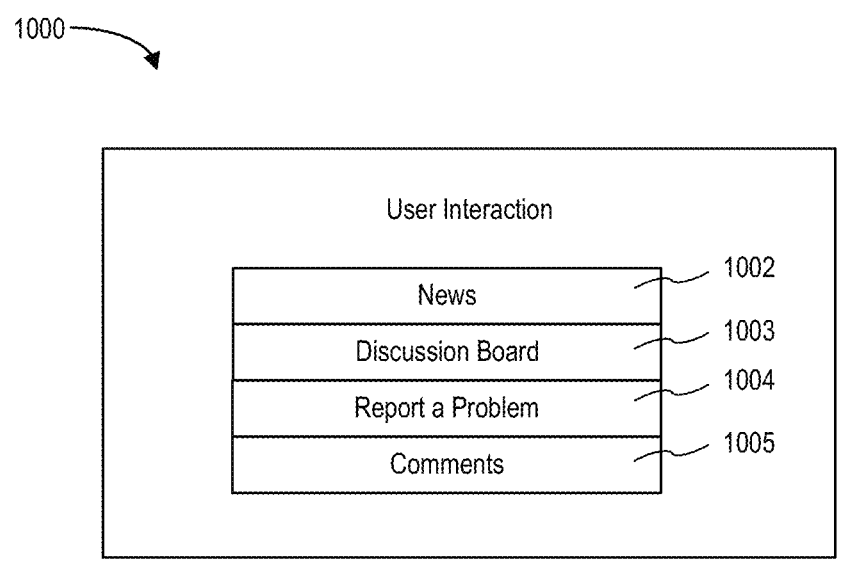
FIG. 10 represents ways in which a user may interact with a system according to some embodiments.

FIG. 10 represents ways in which a user may interact with a system according to some embodiments. The user interactions 1000 describe the ways in which the average user 615 is interacting with the navigation system 601 navigation engine 602, improvement intelligence 603, and navigation repository 604. User interactions 1000 consist of but are not limited to submitting and reading news 1002, posting, contributing, and reading a discussion board 1003, report a problem of a data asset 1004, and consuming and posting comments 1005 on the discussion board.

Figure 11:
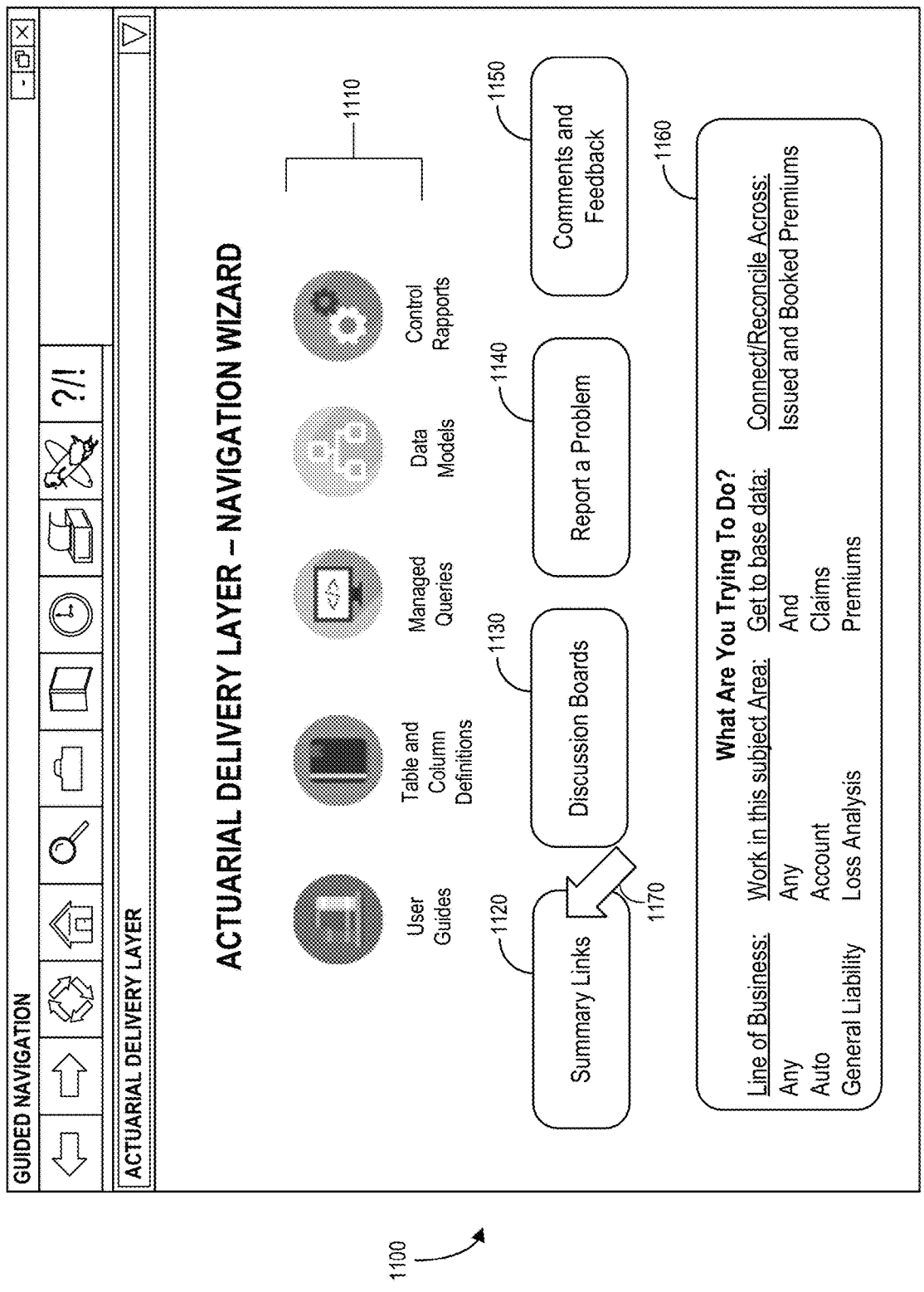
FIG. 11 illustrates an actuary delivery navigation wizard in accordance with some embodiments.

FIG. 11 illustrates an actuary delivery navigation wizard 1100 in accordance with some embodiments. The wizard 1100 includes high-level navigation icons 1110 for user guides, table and column definitions, managed queries, data models, and control reports. Selection of the table and column definition icon 1110 (e.g., via pointer 1170) may take the user, for example, to a wiki page that shows detailed descriptions on all tables and columns including a business definition. The top of the wiki page may include a table of contents that sorts the definitions by line of business and subject area. In the table, the user may find columns including table name and description (e.g., a business definition of the table name). The user can then click on the table name to view a page with the column names.

A user might utilize managed queries to connect to other tables, subjects, or systems. Data models help the connect tables using business keys. Note that a data model's primary function is to show structure content, keys, grain and relationships to other entities. According to some embodiments, selection of the data models icon 1110 will result in a display of the tables, elements, and the keys and how things connect at the table level. These might be for more advanced users, but can be important for such users.

The wizard 1100 also includes user interaction areas for summary links 1120, discussion boards 1130 (e.g., to allow community users to share ideas via a small view of a discussion board that can be enlarged by clicking on a "view all" button and search filters in different ways, including a "Top Contributors" graphic), report a problem 1140, and comments and feedback 1150. According to some embodiments, the wizard 1100 may also display known issues to guides users about known temporary issues (while permanent issues are addressed in user guide), issue description, resolution, scope, and ETA for fixes. The wizard 1100 further includes an area 1160 where the user can indicate what he or she is trying to do (and an appropriate list of documents will be automatically created and displayed for the user).

Figure 12:
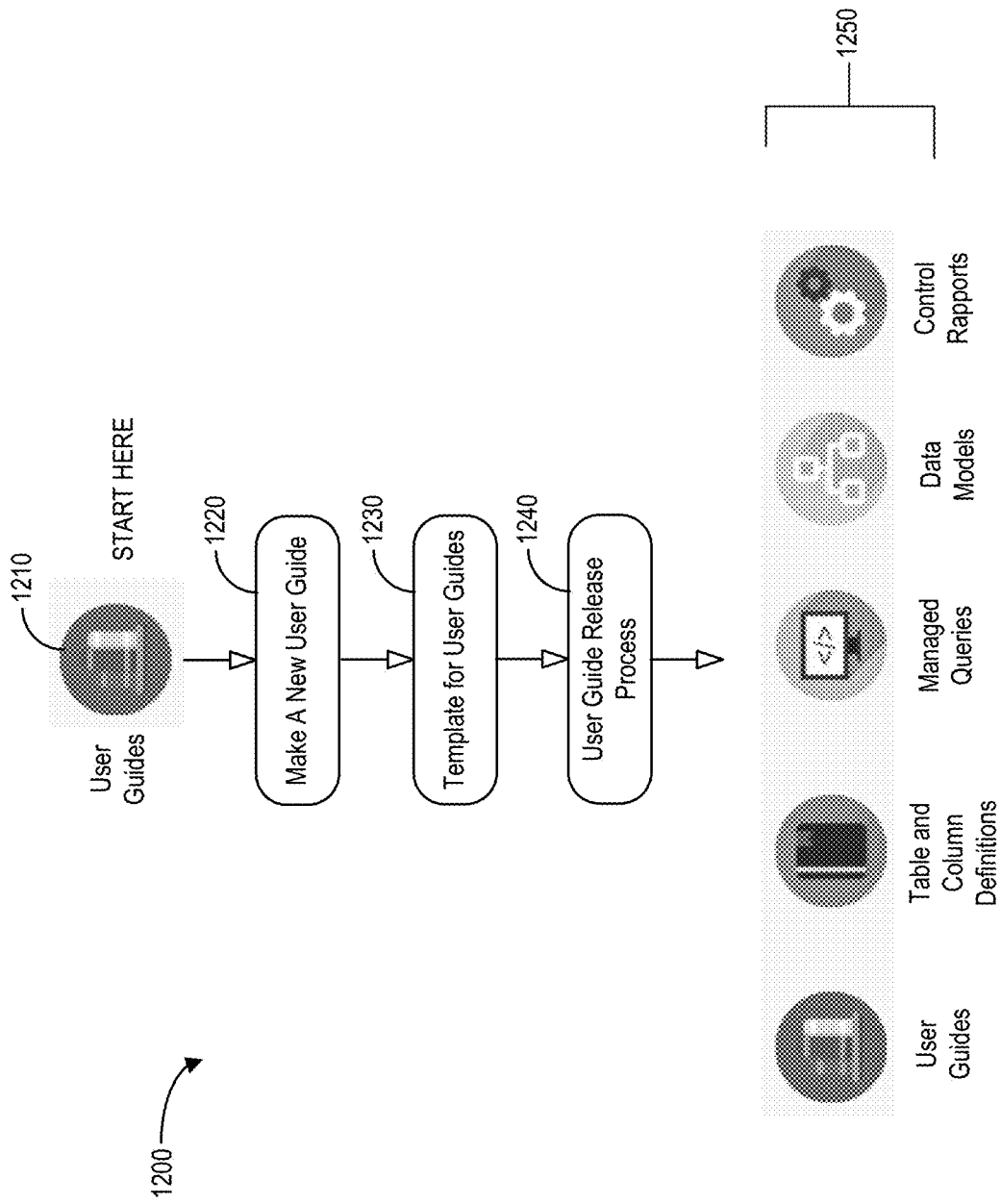
FIG. 12 illustrates a document navigation process according to some embodiments.
Figure 13:
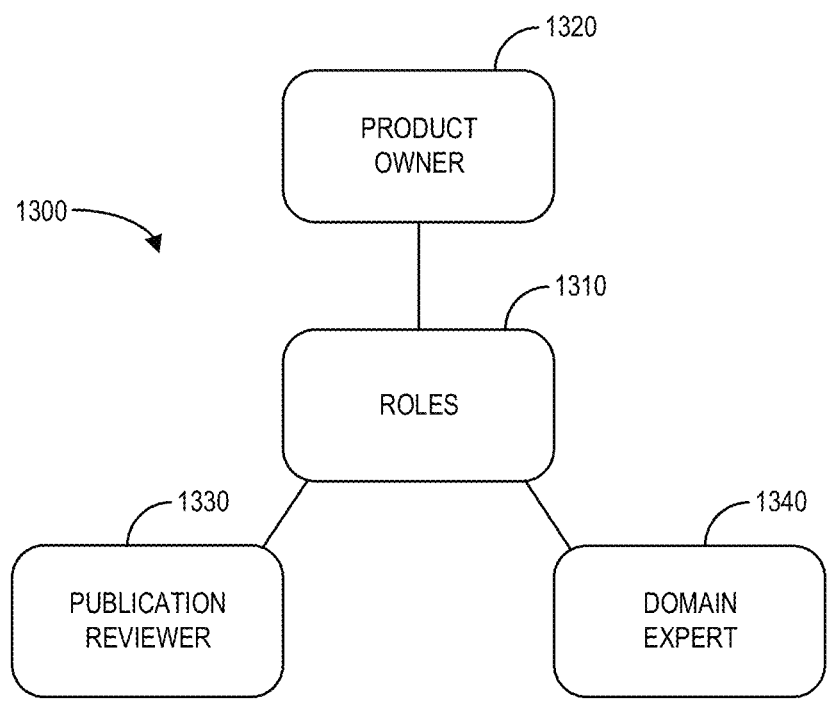
FIG. 13 is a user guide release process in accordance with some embodiments.

FIG. 12 illustrates a document navigation process 1200 according to some embodiments. When a user wants to make a new user guide, the starting point 1210 may take him or her to a discussion 1220 that walks through the process. For example, a user might copy a template for a user guide 1230 and follow a user guide release process 1240. The major components (as represented by the five icons 1250) may the be updated as appropriate. FIG. 13 is a user guide release process 1300 in accordance with some embodiments. Note user roles 1310 may play a central role with respect to product owners 1320, publication reviewers 1330, and domain experts 1340.

Figure 14:
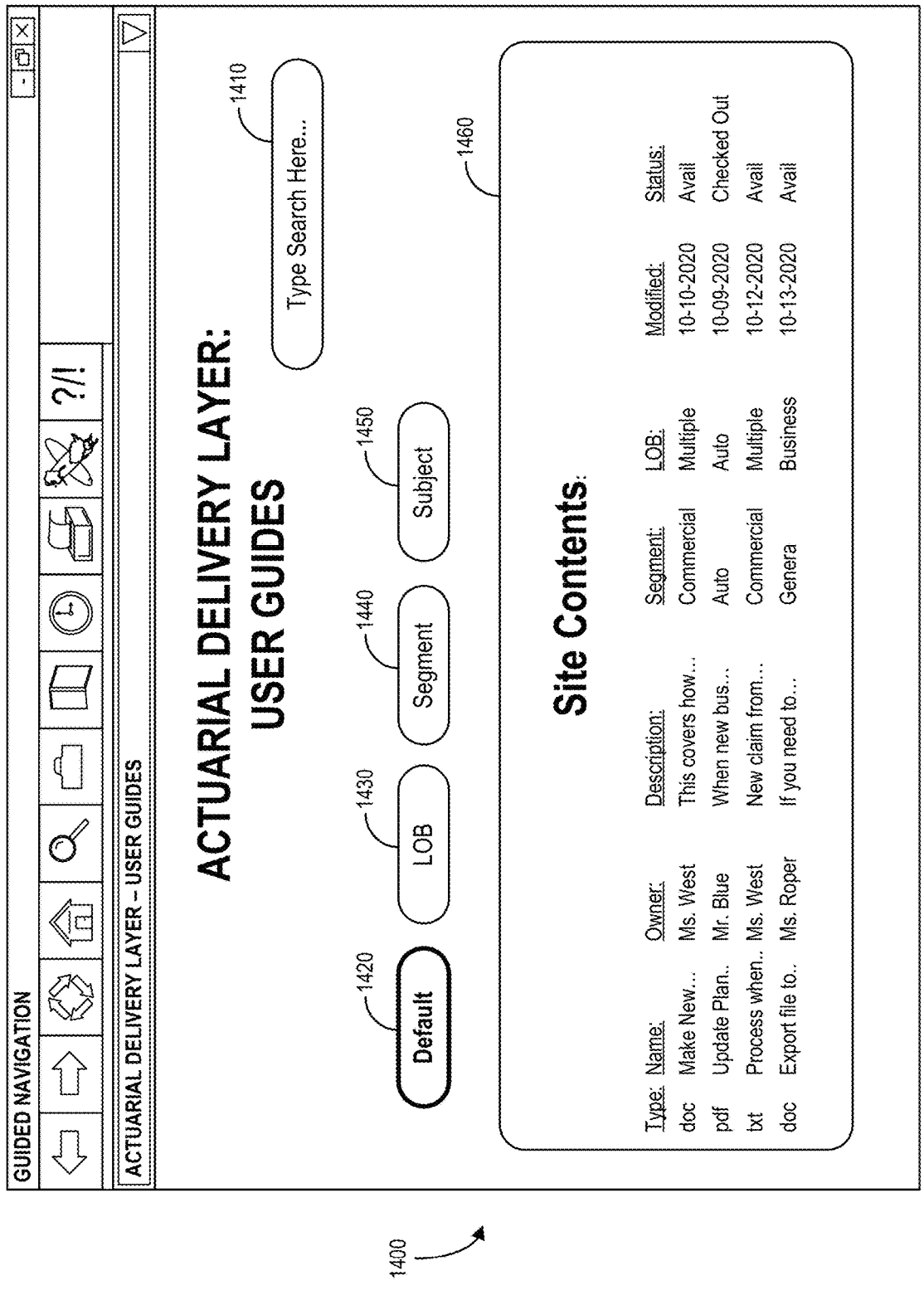
FIG. 14 is a user guide display according to some embodiments.

FIG. 14 is a user guide display 1400 according to some embodiments. The user can enter search terms 1410 or arrange for results to be ordered by default 1420 (as indicated by bold in FIG. 14), Line Of Business ("LOB") 1430, Segment 1440, or Subject 1450. A result area 1460 displays site content representing a sub-set of user guide documents the system has automatically determined are most likely to relevant to the user. Note that a user guide might include: an intended audience, data scope and sources, a business data flow and conceptual model, data history, grain, exclusions, reconciliation, snapshots (e.g., month end snapshots), permanent known issues, an update frequency, a user guide release process, etc.

Figure 15:
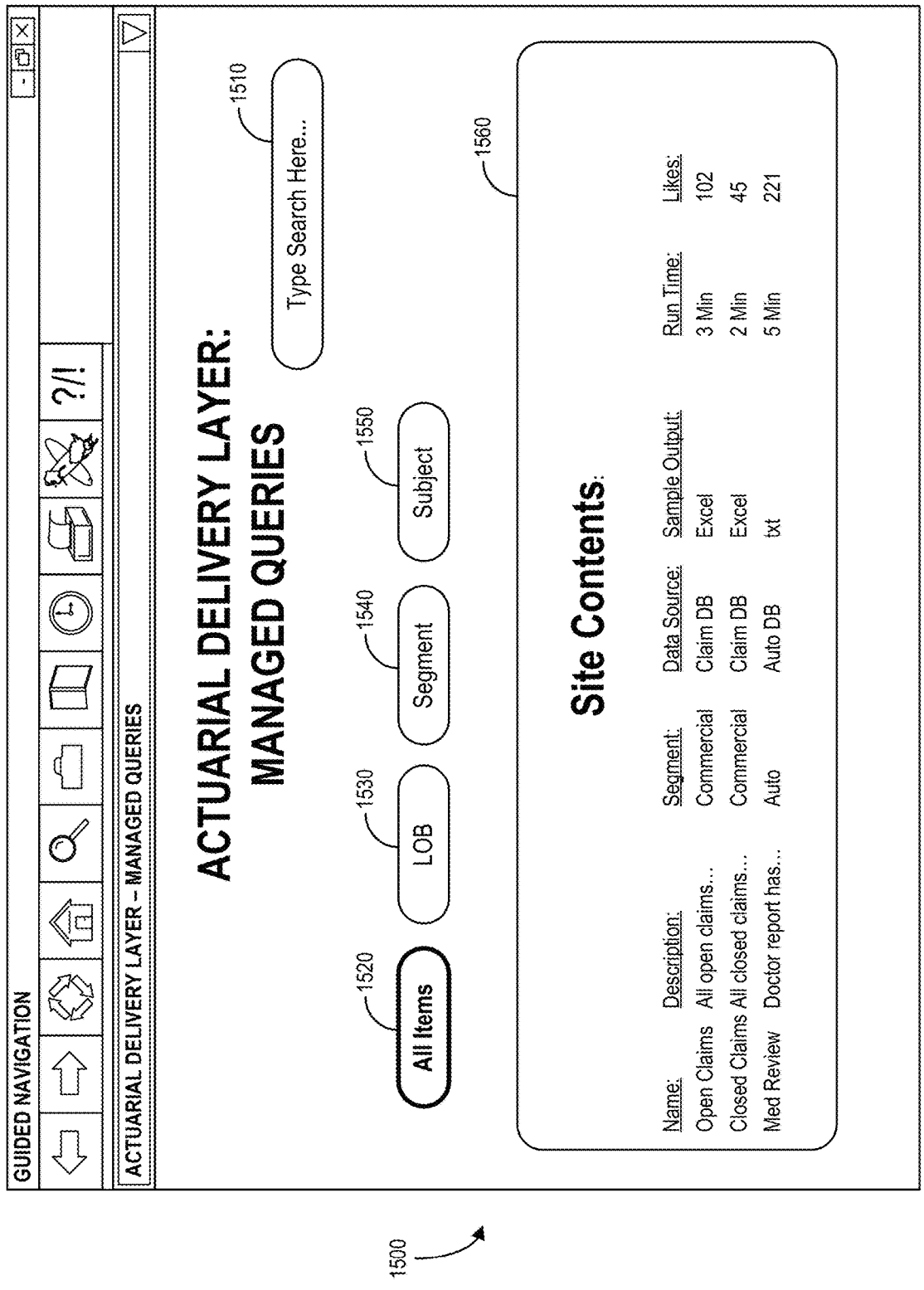
FIG. 15 is a managed query display in accordance with some embodiments.

FIG. 15 is a managed query display 1500 in accordance with some embodiments. As before, the user can enter search terms 1510 or arrange for results to be ordered by "all items" 1520 (as indicated by bold in FIG. 15), LOB 1530, Segment 1540, or Subject 1550. A result area 1560 displays site content representing a sub-set of managed query documents the system has automatically determined are most likely to relevant to the user. According to some embodiments, "queries" (e.g., an SQL query) may do common query work, particularly those that can be tricky for users. In the result area 1560, a data name may show what the query is searching for and a code description may give a quick summary about the query. A data source column may describe where the data is from, "owner" may show who created the query, and "run time" may indicate how long it takes to execute query. Note that "likes" of a query from other users might indicate the popularity of a query and/or a sample output.

Figure 16:
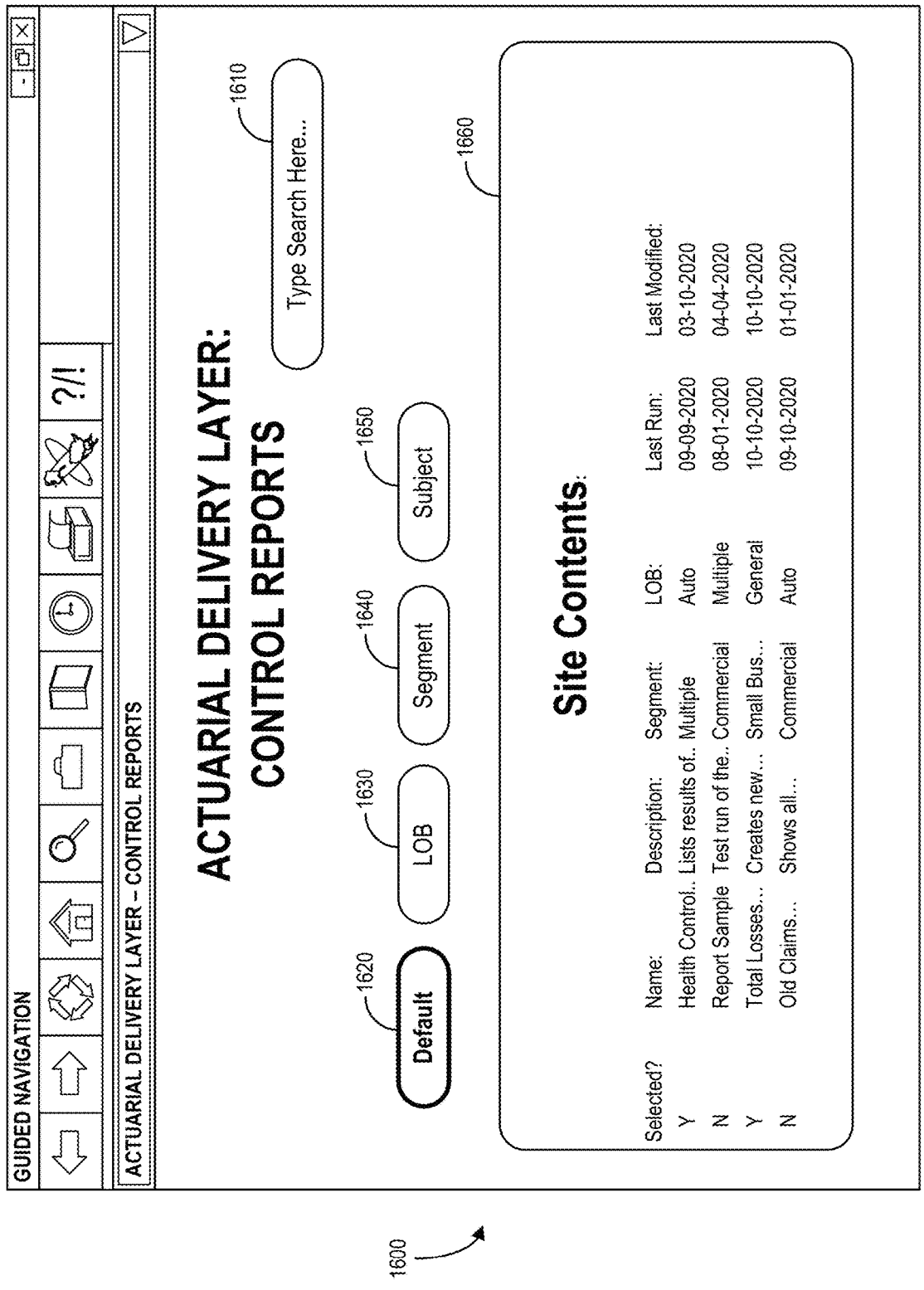
FIG. 16 is a controlled report display according to some embodiments.
Figure 17:
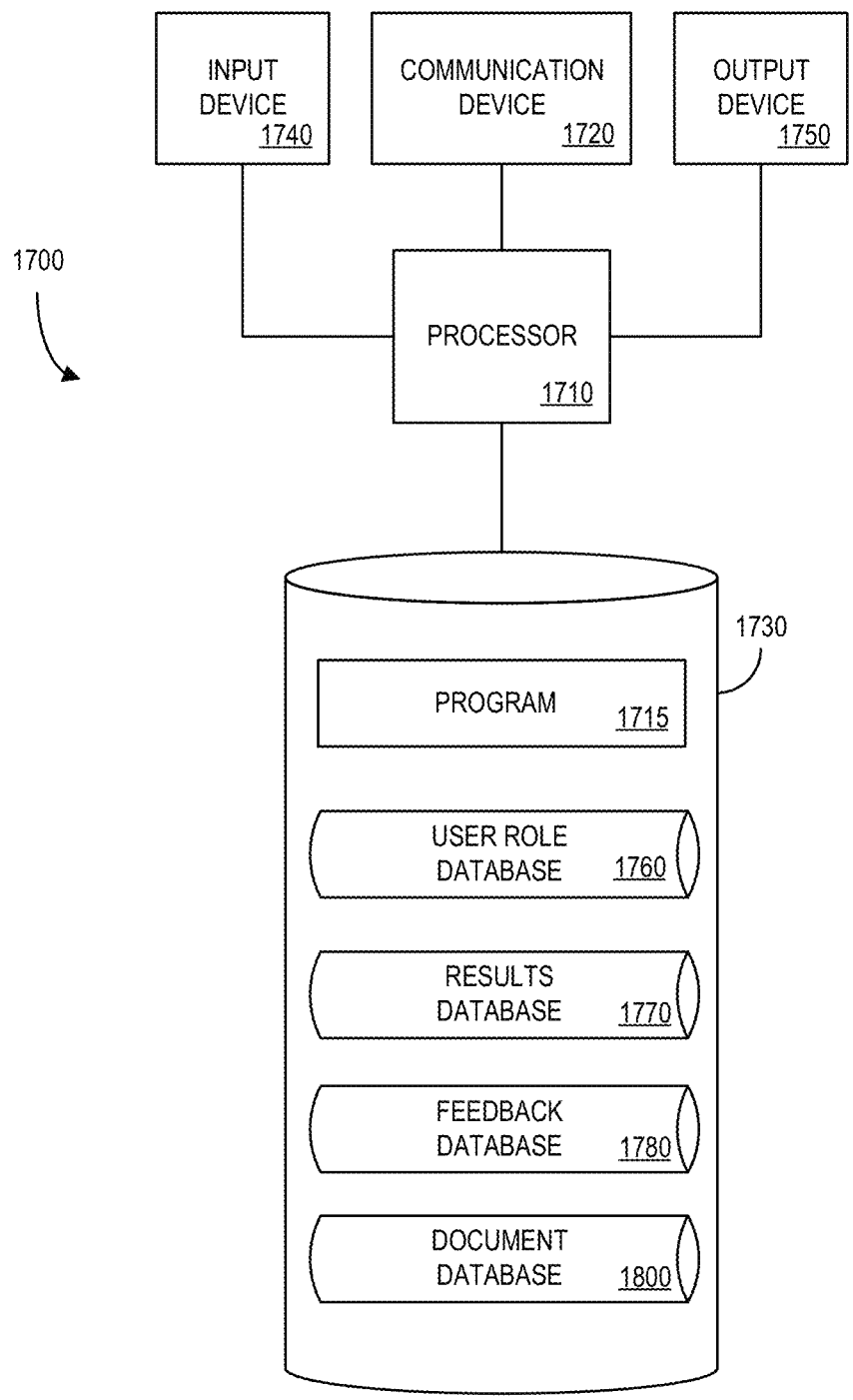
FIG. 17 is a block diagram of an apparatus in accordance with some embodiments of the present invention.

According to some embodiments, the health of data is measured, and that measurement data is, itself, readily searchable in the database. FIG. 16 is a controlled report display 1600 according to some embodiments. As before, the user can enter search terms 1610 or arrange for results to be ordered by "default" 1620 (as indicated by bold in FIG. 16), LOB 1630, Segment 1640, or Subject 1650. A result area 1660 displays site content representing a sub-set of control reports documents the system has automatically determined are most likely to relevant to the user. Note that control reports may be identified as a part of normal team operations. A common source may be the knowledge that developers acquire when working with the data. Some of that knowledge may be codified as control reports. For example, business keys reports should be made to ensure keys from child tables are in parent tables. This is also known as orphan reporting (include cases where business keys return duplicates). Another example might be associated with issuance/booking reconciliation reports. Issuance and booking might be at different grains, yet the information needs to be reconciled. That reconciliation might comprise a permanent system report The embodiments described herein may be implemented using any number of different hardware configurations. For example, FIG. 17 illustrates an automated document navigation system 1700 that may be, for example, associated with the system 100 of FIG. 1. The automated document navigation system 1700 comprises a processor 1710, such as one or more commercially available Central Processing Units ("CPUs") in the form of one-chip microprocessors, coupled to a communication device 1720 configured to communicate via a communication network (not shown in FIG. 17). The communication device 1720 may be used to communicate, for example, with one or more remote user terminals, data stores, and/or or other communication devices (e.g., PCs and smartphones). Note that communications exchanged via the communication device 1720 may utilize security features, such as those between a public internet user and an internal network of the insurance enterprise. The security features might be associated with, for example, web servers, firewalls, and/or PCI infrastructure. The automated document navigation system 1700 further includes an input device 1740 (e.g., a mouse and/or keyboard to enter information about navigation paths, documents, inputs, outputs, etc.) and an output device 1750 (e.g., to output reports regarding system administration, results, current document or user statuses, etc.).

The processor 1710 also communicates with a storage device 1730. The storage device 1730 may comprise any appropriate information storage device, including combinations of magnetic storage devices (e.g., a hard disk drive), optical storage devices, mobile telephones, and/or semiconductor memory devices. The storage device 1730 stores a program 1715 and/or a risk relationship management engine or application for controlling the processor 1710. The processor 1710 performs instructions of the program 1715, and thereby operates in accordance with any of the embodiments described herein. For example, the processor 1710 may access a risk relationship document data store that contains a set of electronic data records including a document identifier and a set of document metadata values. The processor 1710 may receive information from a user associated with the enterprise, and, based on the information received from the user and document metadata values, dynamically create a sub-set of the documents in the risk relationship data document data store. The processor 1710 may provide indications associated with the documents in the dynamically created sub-set to the user via an interactive user interface and receive a selected document of the dynamically created sub-set. The processor 1710 may then, responsive to the selection, deliver the selected document to a remote user device.

The program 1715 may be stored in a compressed, uncompiled and/or encrypted format. The program 1715 may furthermore include other program elements, such as an operating system, a database management system, and/or device drivers used by the processor 1710 to interface with peripheral devices.

As used herein, information may be "received" by or "transmitted" to, for example: (i) the automated document navigation system 1700 from another device; or (ii) a software application or module within the automated document navigation system 1700 from another software application, module, or any other source.

In some embodiments (such as shown in FIG. 17), the storage device 1730 further stores a user role database 1760 (e.g., storing indications about who is an underwriter, claims examiner, etc.), a results database 1770 (e.g., storing query results or successful navigation paths), a feedback database 1780 (e.g., to improve an artificial intelligence engine), and a document database 1800. An example of a database that might be used in connection with the automated document navigation system 1700 will now be described in detail with respect to FIG. 18. Note that the database described herein is only an example, and additional and/or different information may be stored therein. Moreover, various databases might be split or combined in accordance with any of the embodiments described herein. For example, the user role database 1760 and/or document database 1800 might be combined and/or linked to each other within the program 1715.

Figure 18:
FIG. 18 is a portion of a tabular risk relationship document database in accordance with some embodiments.

Referring to FIG. 18, a table is shown that represents the document database 1800 that may be stored at the automated document navigation system 1700 according to some embodiments. The table may include, for example, entries associated with risk relationship documents (e.g., insurance documents) that might be accessed by users. The table may also define fields 1802, 1804, 1806, 1808, 1810, 1812 for each of the entries. The fields 1802, 1804, 1806, 1808, 1810, 1812 may, according to some embodiments, specify: a document identifier 1802, a document name and description 1804, document details 1806, a line of business 1808, a status 1810, and likes 1812. The document database 1800 may be created and updated, for example, based on information electrically received when new documents are added, when users access documents, when users provide positive or negative feedback, etc.

The document identifier 1802 may be, for example, a unique alphanumeric code identifying a risk relationship document. The document name and description 1804 might describe the document, and the document details 1806 may provide a link to pointer to where the document can be located or downloaded, etc. The line of business 1808 might indicate what portion of an enterprise is associated with the document (and may be used, for example, to generate likely documents of interest, filter results, etc.). The status 1810 might indicate if the document is available or if it is currently "checked out" (and, thus, unavailable) by another user who might be in the process of updating the document. The "likes" 1812 might indicate whether or not other users have found the document helpful (e.g., other users who act in the same role for the enterprise).

Embodiments described herein may be associated with any type of risk relationship document. By way of example only, a risk relationship document might comprise a "user guide" knowledge artifact. A user guide might comprise, for example, a communication document intended to give assistance to people using data assets and/or a navigation system. A user guide might include, for example, some or all of the following: an intended audience, a data scope and sources, a business data flow and/or a conceptual model, a data history, a grain, exclusions, reconciliation information, snapshots (e.g., month end snapshots), permanent known issues, an update frequency, etc. For a user guide to be released, it may be accompanied by other constructs such as managed queries, data models, table and column definitions, etc. A user guide release might not be considered complete or valid unless all such artifacts are also updated. The release of a user guide may have three participating roles, each of which can include the participation of multiple people:

Product Owner. A business person who agrees that the user guide addresses meaningful business content and does so in a way that is consumable by the intended audience. Generally, this is associated with the "D" in the Recommend Agree Perform Input Decide ("RAPID") decision framework.

Domain Experts. Those who have worked on the core notions that are the subject of the user guide. This might comprise any combination of both business and technical staff. Generally, this is associated with the "R" in RAPID.

Publication Reviewer. One of the several staff members empowered to ensure the quality of the user guide is up to the standards of the publication site. They do the finishing touches that the domain experts or product owner might not focus on. Generally, this is associated with the "A" in RAPID.

As another example, a risk relationship document might be associated with a "managed query" knowledge artifact. A managed query may capture the knowledge of a team that provide safeguards and enablers of querying the data and lends itself to Structured Query Language ("SQL") or similar data queries. The queries may be known to do common query work, particularly that which can be tricky for users. Examples of tags related to managed queries may include: at the top of the queries list the user can filter their search by selecting a specific line of business or segment; a data name may show what the query is searching for and a code description may give a quick summary on the query; a data source column may describe where the data is from; a segment, line of business, and subject area may specify what query is searching for; an owner may show who created the query; a run time may indicate query run time, etc. When a user clicks on a query he or she will see much of the information on a previous page copied over. A sample code may comprise an area where a user would copy the code and then paste into a program. Sample output mighty comprise a spreadsheet application that gives a sample of what the query should look like when it executes.

As still another example, a risk relationship document might be associated with a "table or column definition" knowledge artifact. Consider, for example, a MetaWiki page that shows detailed descriptions on all tables and columns including a business definition. The table and column definitions may include the proper names, definitions, valid values, and related elements of description for the data. The table may have columns including table name and description (e.g., a business definition of the table name). Lineage information may be published with the table and column definitions. The lineage information might include, for example, lineage "one hop" back to the asset right before the guided navigation system, as well as an originating system of record and an indicator of transformation.

As yet another example, a risk relationship document might be associated with a "control report" knowledge artifact. The control report may comprise a knowledge artifact that has been put in place to let user to build a trust in the data. The control reports may be easily found and understood and may be persisted in the asset itself. According to some embodiments, sufficiently large controls may comprise user stories, and controls commensurate with the data being delivered may be part of the delivery. Note that the health of the data may be measured, and that measurement data is, itself, readily queried in the database. As part of normal team operations, control reports may be identified. A very common source is the queries Quality Assurance ("QA") runs. The system may capture those as recurring control reports. Another is knowledge developers acquire in working with the data. That is, the system may codify some of that knowledge as control reports. Consider following scenarios for control reports:

Business keys. Reports should be made to ensure keys from child tables are in parent tables. This is also known as orphan reporting and includes cases where business keys return duplicates.

Major subjects. In some cases, losses across an enterprise might not exactly balance. Any differences may be in a permanent control report published as part of normal system operations.

Issuance/booking reconciliation. Issuance and booking may be implemented at different grains, yet still need to be reconciled. That reconciliation may be a permanent system report.

According to some embodiments, a risk relationship document might be associated with a "known issue" knowledge artifact. A known issue might guide users on the known temporary issues (while permanent issues are included in a user guide), issue description, resolution, scope, and estimated time of arrival for a fix. Known Issues may contain any concerns with the data that are either recent or still in the queue to be addressed. This includes issues with upstream assets that impact the guided navigation tool (data delivery layer).

As another example, a risk relationship document might be associated with a "data model" knowledge artifact. A data model's function may be to show structure content, keys, grain, and relationships to other entities. Data models tell a user the tables, and the elements, but also the keys and how things connect at the table level. These may be mainly for more advanced users but may be very important to those users. The data model may show the keys in the models (which might not be specified in the database) and may include business keys (typically by colors). Note that model usability may be primarily the responsibility of modelers. Examples may include flat-and wide, parent/child ("relational"), low-cardinality stars, high-cardinality stars, etc.

Although specific hardware and data configurations have been described herein, note that any number of other configurations may be provided in accordance with embodiments of the present invention (e.g., some of the databases described herein may be combined or stored in external systems). Similarly, although a certain number of computing components were provided in connection with some embodiments described herein, other numbers of components (and different types of components) might be used instead. Still further, the displays and devices illustrated herein are only provided as examples, and embodiments may be associated with any other types of user interfaces.

Figure 19:
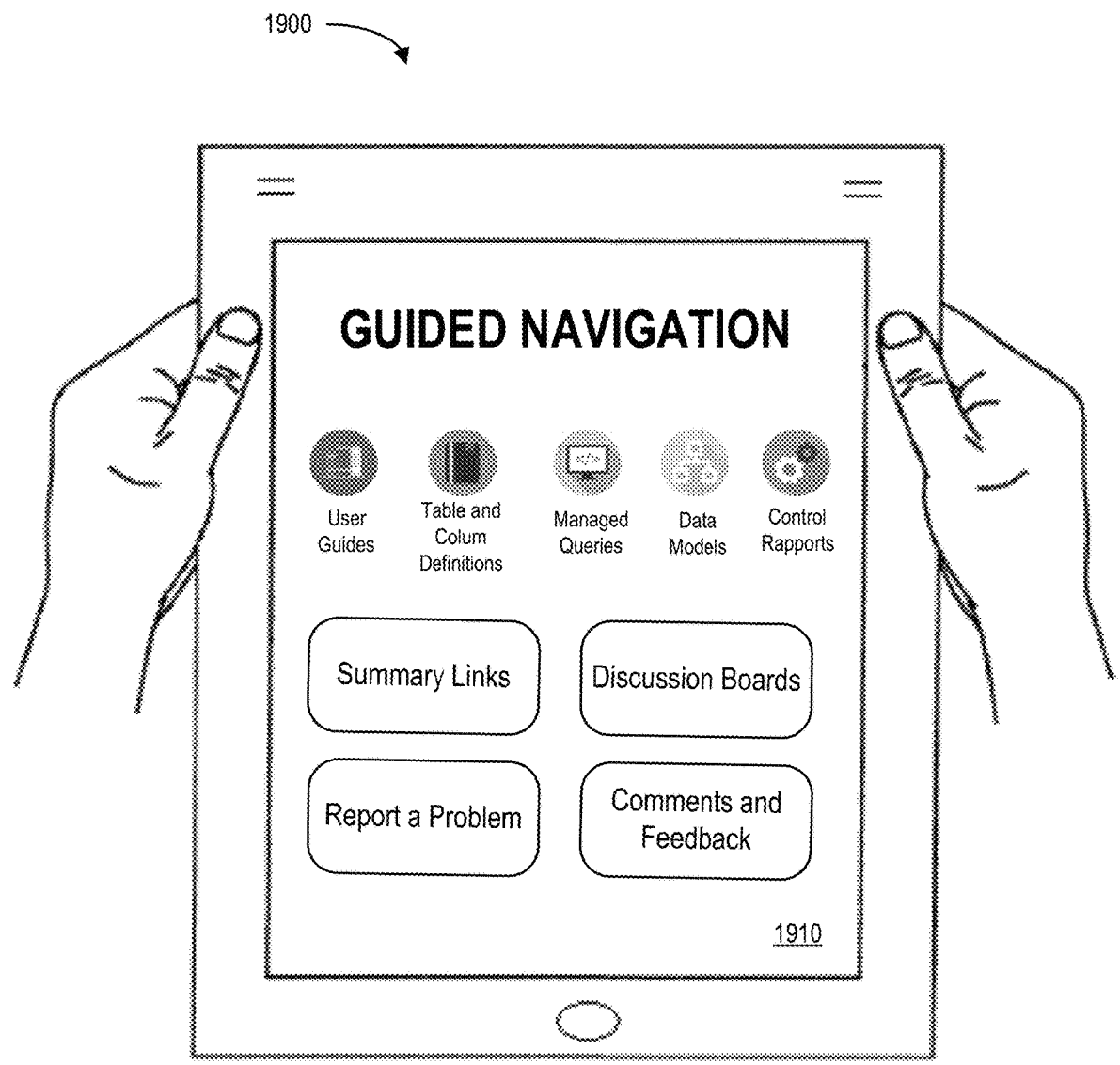
FIG. 19 illustrates a tablet computer displaying a document navigation user interface according to some embodiments.

For example, FIG. 19 illustrates a handheld tablet computer 1900 displaying a document navigation display 1910 according to some embodiments. The document navigation display 1910 might include various metadata values that can be selected and/or modified by a user of the handheld computer 1900 (e.g., to navigate to a particular document, to provide feedback about a subset of documents, etc.).

Thus, embodiments may users in an enterprise, such as actuaries in an insurance company, to create and navigate documents navigation paths associated with operational business workflows at an enterprise scale in a manner that allows for real-time tuning of user document navigation to drive and improve business operations.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A system to facilitate user guidance to risk relationship documents for an enterprise, comprising:
   (a) a risk relationship document data store containing a set of electronic data records, each electronic data record being associated with a risk relationship document and including a document identifier and a set of document metadata values;
   (b) a document navigation computer, coupled to the risk relationship document data store, programmed to:
      (i) receive information from a user associated with the enterprise,
      (ii) based on the information received from the user and document metadata values, dynamically create a sub-set of the documents in the risk relationship data document data store, and
      (iii) provide an ability for users to share, update, and communicate information, including the metadata values;
   (c) an interactive user interface display computer, coupled to the document navigation computer, programmed to:
      (i) provide indications associated with the documents in the dynamically created sub-set to the user via an interactive user interface,
      (ii) receive, via the interactive user interface, a selected document of the dynamically created sub-set, and
      (iii) responsive to the selection, deliver the selected document to a remote user device; and
   (d) a navigation repository within the document navigation computer, including a business data repository that contains:
      a repository data dictionary to store business information in human-readable text, including a column name, a column definition, and valid values for a column, the repository data dictionary being searchable via a plain text search,
      an ontology tagging element to tag users and components of the business data repository among each other, and
      a repository schema for tables, columns, and cells;
   wherein the system collects user navigation decisions and user feedback and the navigation decisions and the user feedback are automatically analyzed to redesign graphical user interfaces and navigation paths within the selected document, and further wherein increased user experience increases weights assigned to navigation decisions during said analysis, and further wherein data elements gathered from any point in a navigation path are stored to a repository that serves as input to a general-purpose artificial intelligence engine for recommendations for continual improvement through the intervention of human beings trained in data science.

2. The system of claim 1, wherein the document navigation computer uses a product structure, a line of business classification, a business segment, and a data subject to facilitate navigation.

3. The system of claim 1, wherein the system connects the user to an enterprise identity system to extract organizational affiliations used by the document navigation computer to guide users.

4. The system of claim 1, wherein underlying data assets are tagged at a schema, table, column, or cell level as needed to allow for recommendation by the document navigation computer based on parallel ontology for users.

5. The system of claim 4, wherein users are tagged with an ontology that allows for a connection between the users and data assets based on parallel ontology for data assets.

6. The system of claim 5, wherein tagging ontologies are persisted to an underlying data store in industry standard technologies that lets other software utilize the data for extended analysis, design, and implementation around the enterprise.

7. The system of claim 1, wherein users can design and structure new data elements to be implemented and used in insurance business processes and functions employing navigational functions.

8. The system of claim 1 wherein users can administer creation and maintenance of data asset documentation.

9. The system of claim 1, wherein users can redesign individual graphical user interface and navigational paths based on intended use.

10. The system of claim 1, wherein users can review and affiliate themselves with other user profiles to facilitate reuse of similar user experiences based on self-defined role identification.

11. The system of claim 1 wherein the system reuses classified user role experience to facilitate prevention of user error.

12. The system of claim 1 wherein the document navigation computer allows for escalation and reporting of data issues through an incident management system.

13. The system of claim 12, wherein the document navigation computer allows for the escalation and reporting of data issues through the incident management system based on a parallel ontology for users.

14. The system of claim 1 wherein the document navigation computer provides an asynchronous tool to let users to electronically exchange data content thoughts, theories, and questions using discussion threads.

15. The system of claim 1, wherein the document navigation computer tracks an asynchronous tool's top contributors and displays the list electronically.

16. The system of claim 1, wherein the system routinely validates and changes data asset documentation based on user comments, latest updates, and direct connection to data assets.

17. The system of claim 1 wherein the system retrieves some or all underlying business data assets for to guide a navigation path either through user feedback or artificial intelligence.

18. The system of claim 1 wherein users can review navigation paths of other users and store an affiliation of themselves with such navigation paths for their own use.

19. The system of claim 1 wherein the system scans data dictionaries of underlying business data assets as a mechanism of populating user navigation paths and presenting them to users for selection.

20. The system of claim 1, wherein the document navigation computer uses persistent data in disk and an artificial intelligence engine to communicate the health of data assets through an outbound communication system.

21. The system of claim 1, wherein the document navigation computer uses subscription information, navigation history, and artificial intelligence engine to customize outbound communication to users based on relevancy.

22. The system of claim 1 wherein the document navigation computer identifies data subject matter experts based on stamps applied to their use to navigate future users through the most direct path based on their request.

23. The system of claim 1, wherein the document navigation computer recommends users to subject matter experts who can help resolve data issues faster and can contribute in talent development across the enterprise.

24. The system of claim 1, wherein at least one risk relationship document comprises a knowledge artifact associated with at least one of: (i) a user guide, (ii) a managed query, (iii) a table or column definition, (iv) a control report, (v) a known issue, and (vi) a data model.

25. A computerized method to facilitate user guidance to risk relationship documents for an enterprise, comprising:
- receiving, at a document navigation computer, information from a user associated with the enterprise;
- accessing, from a risk relationship document data store, electronic data records, each electronic data record being associated with a risk relationship document and including a document identifier and a set of document metadata values;
- based on the information received from the user and document metadata values, dynamically creating a sub-set of the documents in the risk relationship data document data store;
- providing, by a document navigation computer, an ability for users to share, update, and communicate information, including the metadata values;
- providing, from an interactive user interface display computer, indications associated with the documents in the dynamically created sub-set to the user via an interactive user interface;
- receiving, via the interactive user interface, a selected document of the dynamically created sub-set;
- responsive to the selection, delivering the selected document to a remote user device;
- collecting user navigation decisions and user feedback;
- establishing and updating a navigation repository within the document navigation computer, including a business data repository that contains:
  - a repository data dictionary to store business information in human-readable text, including a column name, a column definition, and valid values for a column, the repository data dictionary being searchable via a plain text search,
  - an ontology tagging element to tag users and components of the business data repository among each other, and
  - a repository schema for tables, columns, and cells; and
- automatically analyzing the navigation decisions and the user feedback to redesign graphical user interfaces and navigation paths within the selected document, and further wherein increased user experience increases weights assigned to navigation decisions during said analysis,
- wherein data elements gathered from any point in a navigation path are stored to a repository that serves as input to a general-purpose artificial intelligence engine for recommendations for continual improvement through the intervention of human beings trained in data science.

* * * * *